United States Patent
Yonenoi

(10) Patent No.: US 7,254,854 B2
(45) Date of Patent: Aug. 14, 2007

(54) MULTI-FUNCTIONAL COMPACT LINE CLIPPER FOR FISHING

(76) Inventor: Kimio Yonenoi, Bias Ichiggo B-117, No. 5-1, Nishi 5-chome, Eda, Aoba-Ku, Yokohami-Shi, Kanagawa-Ken (JP)

( * ) Notice: Subject to any disclaimer, the term of this patent is extended or adjusted under 35 U.S.C. 154(b) by 523 days.

(21) Appl. No.: 10/386,753

(22) Filed: Mar. 12, 2003

(65) Prior Publication Data
US 2004/0177545 A1 Sep. 16, 2004

(51) Int. Cl.
*A01K 69/00* (2006.01)
*B26B 11/00* (2006.01)

(52) U.S. Cl. ................................ 7/106; 7/158; 30/143

(58) Field of Classification Search .................... 7/106, 7/118, 120, 158; 30/143
See application file for complete search history.

(56) References Cited

U.S. PATENT DOCUMENTS

| 594,984 A | * | 12/1897 | Chapman | 86/22 |
| 3,316,634 A | * | 5/1967 | Bliss | 30/143 |
| 3,825,961 A | * | 7/1974 | Klein | 7/106 |
| 5,283,920 A | * | 2/1994 | Plummer | 7/106 |
| 5,960,504 A | * | 10/1999 | Dougherty | 15/104.001 |
| 6,045,234 A | * | 4/2000 | Leeds | 362/119 |

FOREIGN PATENT DOCUMENTS

| JP | 3033531 | 11/1996 |
| JP | 3069176 | 3/2000 |

* cited by examiner

*Primary Examiner*—Dana Ross
(74) *Attorney, Agent, or Firm*—Jay L. Chaskin

(57) ABSTRACT

A multi-functional compact clipper for fishing includes a rotatable base plate and an upper and lower holding plates that form a space therebetween. The rotatable base plate has a pair of upper and lower grooves at one end, an axial end at another end, a stop disposed a at middle rear side and a needle at an inside wall of a hollow formed on a front side. The rotatable base plate connects elastically with a threaded device and pivotally with the holding plates. The threading device provides a threading wire and a slit connecting with the grooves of the rotatable base plate. The upper holding plate is provided with a cutter set magnetically in a hole of a projected end of the upper holding plate. The rotatable base plate is pivotally folding into and drawn out of the space between the holding plates. The stop limits the rotation of the rotatable base plate by engagement with cavities formed on the upper and lower holding plates.

16 Claims, 2 Drawing Sheets

MULTI-FUNCTIONAL COMPACT LINE CLIPPER FOR FISHING

BACKGROUND OF THE INVENTION

The present invention relates to a line cutter and particularly for a multi-functional compact line clipper for fly fishing and provides a means for threading of the line, a means for cleaning of the fly and a means for cutting the line.

Customarily, in fly fishing, a fly or a feather jig is attached, on a hook, a suspected bait modeled after an aquatic insect, a terrestrial insect or a small fish is used for live bait. However, the fishing lines, such as the main line, a leader line, has to be exchanged at times to more suitable line adapted for the fishing conditions, such as the weather, the location of the fishing or the time of day.

A line clipper that is provided with a cutter or scissor for the exchange of the fishing line has become a standard tool for a fisherman, particularly a fly fisherman. Typical line clippers are disclosed in Japanese Utility Models No. 3069176 and 3033531. The prior art typically is limited to a line clipper and does not have a multi-functional use and does not provide operational flexibility to accommodate fishing conditions.

BRIEF DESCRIPTION OF THE INVENTION

An embodiment of the present invention provides a line clipper having a cutting function for a fishing line and additional functions, such as threading the fishing line into the fishing fly and cleaning of the fly.

In an embodiment of the present invention, a line clipper comprises a rotatable base plate having substantially a fixed width, length and thickness, that provides a threading wire in a shape of a lozenge on one end and an axial portion on another end, a pair of lower and upper holding plates having dimension that can cover over the threading wire together with the rotatable base plate between them, connecting rotatably at each one end with the axial portion of the rotatable base plate and, provides an exchangeable cutter in an end projection of the upper holding plate.

In an embodiment of the present invention, a line clipper proves a means for cleaning. The means for cleaning may comprises a needle pin for cleaning an eye of a feather jig, the pin being disposed on an inside wall of a hollow, arranged at one end portion of the rotatable base plate.

In an embodiment of the present invention, a line clipper provides a means for threading. The means for threading may comprise a device having a holding slit for detachable connection to a rotatable base plate so that a new threading device can be dispensed for the old device once the old device becomes unusable.

In an embodiment of the present invention, a line clipper provides means for holding a cutter. The means for cutting may comprise a magnet in an upper portion of a hole of an end projection on an upper holding plate so that a new cutter can be easily exchanged and set if the present cutter has become unusable.

In an embodiment of the present invention, a line clipper provides at a means for stopping a rotatable base plate and a threading device when drawn into a space between upper and lower holding plates or drawn out from the space. The means for stopping may be disposed at a middle rear side portion of a rotatable base plate and the stop may be longer than a distance between a lower and upper holding plates.

BRIEF DESCRIPTION OF THE DRAWINGS

The invention and embodiments thereof will be better understood from the following description and the drawings, in which.

DETAILED DESCRIPTION OF THE INVENTION

Figure 1:
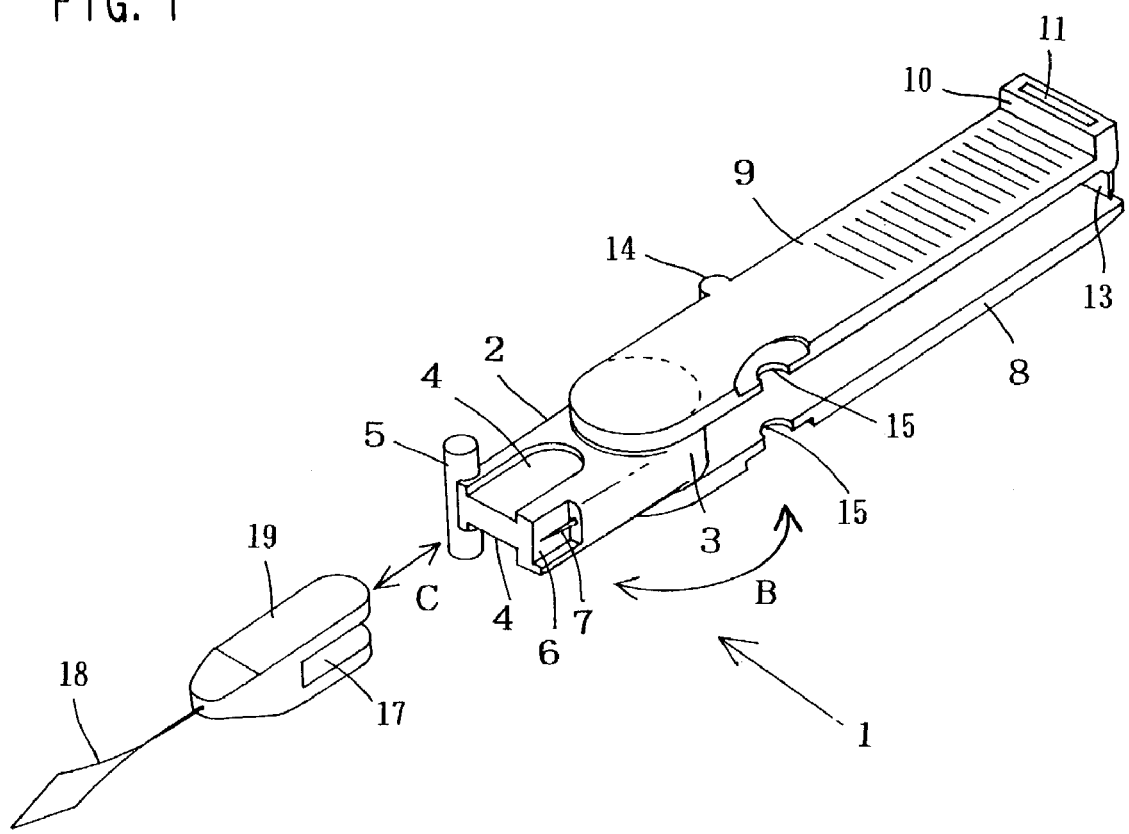
FIG. 1 is a perspective view of a line clipper for an embodiment of the present invention.
Figure 2:
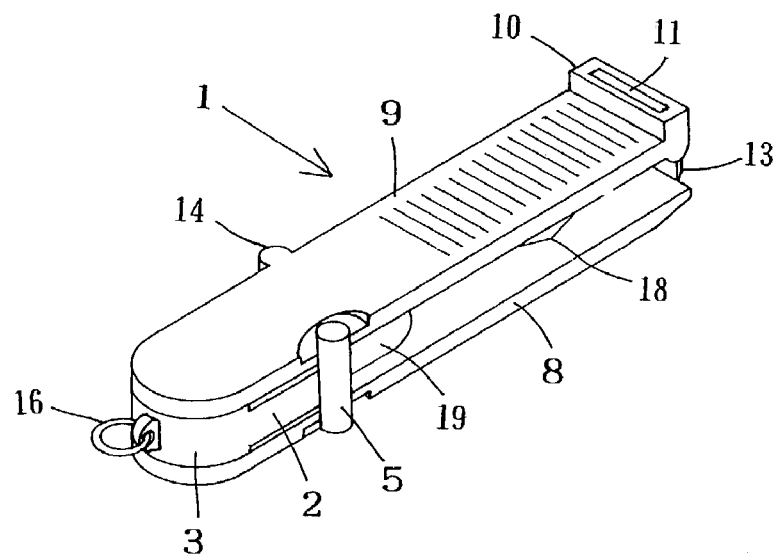
FIG. 2 is a perspective view of the line clipper of FIG. 1 and shows a rotatable base plate held between lower and upper holding plates.
Figure 3:
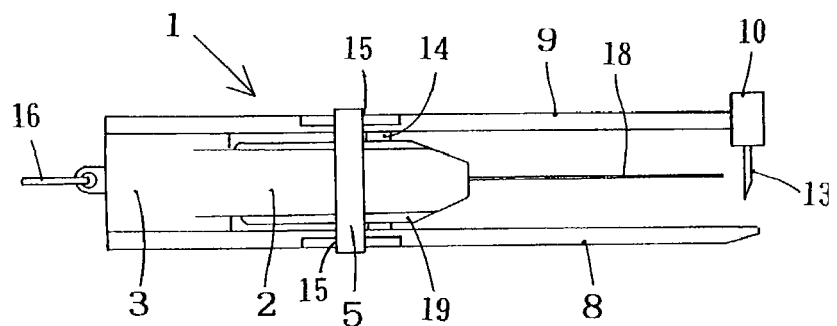
FIG. 3 is a front view of the line clipper of FIG. 1.
Figure 4:
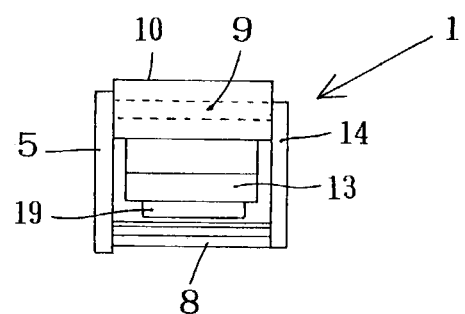
FIG. 4 is a side view of the line clipper of FIG. 2 as seen from a right side.

As shown in FIG. 1, a line clipper 1 can be formed of a plastic material having suitable elasticity and comprise a rotatable base plate 2, a pair of lower and upper holding plates 8, 9, connected pivotally with the base plate 2 at an axial portion 3 at one end and means for threading 19 for a fishing line A (see FIG. 5) connected elastically with another end of the rotatable base plate.

The rotatable base plate 2 has substantially fixed dimensions of width, length and thickness and is provided at the end axial portion 3 with a pair of lower and upper shallow grooves 4 at lower and upper ends for pivotal and elastic connection, respectively.

The rotatable base plate 2 is provided with means for stopping 5 the rotatable base plate and means for threading when drawn into or out of a space formed by the lower and upper holding plates 8, 9. The means for stopping 5 may comprise a member that is longer than its thickness, at a rear side end portion.

The line clipper may comprise means for cleaning comprising a needle 7 on an inside wall of a hollow 6 arranged on a front side of the other end portion of the rotatable base plate 2.

On another side, the lower and upper holding plates 8, 9 that have dimensions of substantially the same width and about three times the length of the rotatable base plate 2, is pivoted rotatably on and under the axial portion 3 formed at one end.

Figure 5:
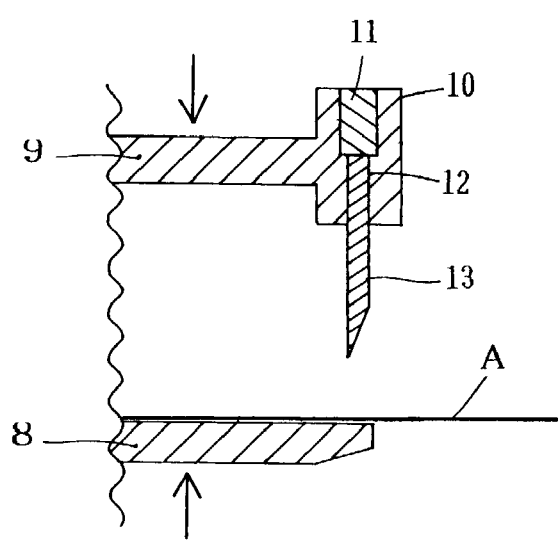
FIG. 5 is an elongated partial sectional view of a cutter portion of the line clipper of FIG. 3.

As shown in FIG. 5, a cutter 13 is fixed magnetically in a through hole 12 opened in a projection 10 at another end of the upper holding plate 9, by a magnet 11 set in an upper larger portion of the hole 12.

The lower holding plate 8 and upper holding plate 9 provides a pair of upper and lower cavities 15 for engaging the stop 5 of the rotatable base plate 2. As a result the rotatable base plate 2 can be easily folded into and drawn out from a space between the holding plates 8, 9 by turning or rotating the plates 8, 9 toward stop 5 in the direction as shown by arrow B. A reinforcement member 14, connects together the plates 8, 9, is on an opposite side of the cavities 15.

A hanger 16 is provided on an outside end portion of axial portion 3 of the rotatable base plate 2 so that the line clipper 1 can secured to, for example, a belt, to prevent loss.

A means for threading 19 can be separated from the rotatable base plate 2. The means for threading 19 provides a fine threading wire 18 formed in the shape of a rhombus at one end and a connecting slit 17 at another end. The means for threading 19 is connected and disconnected elastically onto lower and upper shallow grooves 4 on the rotatable base plate 2 through slit 17 in the direction of arrow C.

The combination of features described comprises a fishing line clipper 1 having multiple functions, to include means for threading the fishing line, means for cutting the fishing line and means for cleaning, for example, the attached fly. Accordingly, the fishing line clipper 1 can easily cut off the fishing line A by merely placing the line between the lower and upper holding plates 8, 9 and pressing the plates. The cutting function is possible even if the rotatable base plate 2 has been folded into the space between the holding plates 8, 9 or drawn out therefrom, a shown in FIG. 5. Thereafter, the holding plates 8, 9 may be restored automatically to their original state, due to their elasticity.

The rotatable base plate 2 provides a detachable means for threading 19 and means for cleaning 7. The means for cleaning 7 may be permanently fixed to the line clipper 1, for example, on the rotatable base plate 2. The device of the means for threading 19 can be easily exchanged if the threading wire 18 has broken off or otherwise damaged. The needle 7 of the means for cleaning can be used to clean an eye of the fly, as it is, on the rotatable base plate 2. The rotatable base plate 2 can be folded by rotation to be disposed between the upper and lower holding plates 8, 9. The described line clipper 1 comprises, therefore, a substantially rectangular device having multiple functions for fishing.

The advantageous effects of the described line clipper 1 include:

a. The fishing line A can be cut, as it is, in either the folded form of the rotatable base plate 2 or when the rotatable base plate is unfolded from between the upper and lower holding plates 8, 9 or both.

b. The cutter 13 can be easily exchanged and firmly held without falling off due to the magnet 11 in a hole 12 of the end projection 10 at one end of one of the holding plates 8 or 9.

c. The line clippers 1 has two further functions, such as threading a line and cleaning an eye of the fly or hook, are added to the original cutting function by the rotatable base plate 2 which provides a detachable threading device 19 and a fixed needle pin 7.

d. The threading device 19 is detachable from the rotatable base plate 2 so that a new device 19 can be easily exchanged if the fine threading wire 18 has become deformed or damaged. The threading device 19 can be folded in a narrow space between the lower and upper holding plates 8, 9 so that the threading wire 18 at one end can be prevented from deformation or damage as a result of contact with other fishing tools.

e. The described line clipper 1 is very economic in manufacture and convenience for handling. It need not be disposable except for the cutter and the threading device. The described line clipper 1 is compact.

One skilled in the art may make or propose various modifications in structure and/or function and/or way or equivalents thereof without departing from the scope and extent of the disclosed invention or embodiments thereof.

What is claimed is:

1. A clipper for fishing comprising:
   a rotatable base plate;
   upper and lower holding plates forming a space therebetween;
   means for cleaning disposed on the rotatable base plate comprising a needle disposed in a hollow formed on a wall of the rotatable base plate;
   means for threading detachable from the rotatable base plate;
   the upper and lower holding plates having a respective same one end pivotally connecting with a pivotal end of the rotatable base plate;
   means for cutting provided at another end of one of the holding plates;
   the means for threading being rotatably folded in and withdrawn from the space between the upper and lower holding plates; and
   the rotatable base plate being rotatably folded in and withdrawn from the space.

2. The clipper of claim 1 wherein the means for threading has a slit for detachably connecting with grooves on the rotatable base plate.

3. The clipper of claim 2 comprising means for stopping disposed on the rotatable base plate for engagement with a cavity on at least one holding plate to provide folding into and drawing out of the space between the holding plates.

4. The clipper of claim 1 wherein the means for cutting is detachable and disposed in a hole at a projected end of one of the holding plates.

5. The clipper of claim 4 comprising a magnet arranged in an upper portion of the hole to retain a cutter.

6. The clipper of claim 5 comprising means for stopping disposed on the rotatable base plate for engagement with a cavity on at least one holding plate to provide folding into and drawing out of the space between the holding plates.

7. The clipper of claim 4 comprising means for stopping disposed on the rotatable base plate for engagement with a cavity on at least one holding plate to provide folding into and drawing out of the space between the holding plates.

8. The clipper of claim 1 comprising means for stopping disposed on the rotatable base plate for engagement with a cavity on at least one holding plate to provide folding into and drawing out of the space between the holding plates.

9. The clipper of claim 1 wherein the upper and lower holding plates are made from an elastic material.

10. The clipper of claim 1 comprising means for reinforcement disposed on one side of the holding plates.

11. The clipper of claim 1 comprising means for hanging the clipper disposed on the rotatable base plate.

12. A clipper for fishing comprising:
   a rotatable base plate;
   upper and lower holding plates forming a space therebetween;
   means for threading having a slit for detachably connecting with grooves on the rotatable base plate;
   the upper and lower holding plates having a respective same one end pivotally connecting with a pivotal end of the rotatable base plate;
   means for cutting provided at another end of one of the holding plates;
   the means for threading being rotatably folded in and withdrawn from the space between the upper and lower holding plates;
   means for cleaning is disposed in a hollow formed on a wall of the rotatable base plate; and
   the rotatable base plate being rotatably folded in and withdrawn from the space.

13. A clipper for fishing comprising:
   a rotatable base plate;
   upper and lower holding plates forming a space therebetween;
   means for threading;
   means for cleaning disposed on the rotatable base plate;

the upper and lower holding plates having a respective same one end pivotally connecting with a pivotal end of the rotatable base plate;

means for cutting detachable from and disposed at another end of one of the holding plates;

the means for threading being rotatably folded in and withdrawn from the space between the upper and lower holding plates; and the rotatable base plate being rotatably folded in and withdrawn from the space.

14. A clipper for fishing comprising:

a rotatable base plate;

upper and lower holding plates forming a space therebetween;

means for threading;

means for cleaning disposed on the rotatable base plate comprising a needle disposed in a hollow formed on a wall of the rotatable base plate;

the upper and lower holding plates having a respective same one end pivotally connecting with a pivotal end of the rotatable base plate;

means for cutting provided at another end of one of the holding plates;

the means for threading having a slit for detachably connecting with grooves on the rotatable base plate and being rotatably folded in and withdrawn from a space between the upper and lower holding plates;

means for stopping disposed on the rotatable base plate for engagement with a cavity on at least one holding plate to provide folding into and drawing out of the space between the holding plates; and the rotatable base plate being rotatably folded in and withdrawn from the space.

15. A clipper for fishing comprising:

upper and lower holding plates forming a space therebetween;

a rotatable base plate disposed in the space;

the upper and lower holding plates having a respective same one end pivotally connecting with a pivotal end of the rotatable base plate;

means for threading having a slit detachably connecting with grooves on the rotatable base plate;

the means for threading being rotatably folded in and withdrawn from the space between the upper and lower holding plates;

a needle disposed in a hollow formed on a wall of the rotatable base plate; and the rotatable base plate being rotatably folded in and withdrawn from the space.

16. A clipper for fishing comprising:

upper and lower holding plates forming a space therebetween;

a rotatable base plate disposed in the space;

the upper and lower holding plates having a respective same one end pivotally connecting with a pivotal end of the rotatable base plate;

means for cutting provided at another end of one of the holding plates; and a needle disposed in a hollow formed on a wall of the rotatable base plate.

* * * * *